(12) United States Patent
Saare et al.

(10) Patent No.: US 7,539,776 B1
(45) Date of Patent: May 26, 2009

(54) DYNAMIC UNIFORM RESOURCE LOCATOR COMPRESSION

(75) Inventors: John E. Saare, Lakeport, CA (US); Luu D. Tran, Santa Clara, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1085 days.

(21) Appl. No.: 10/870,605

(22) Filed: Jun. 17, 2004

(51) Int. Cl.
*G06F 15/16* (2006.01)
(52) U.S. Cl. .................. 709/247; 709/246; 709/230
(58) Field of Classification Search .............. 709/218, 709/203, 224, 246, 247, 230; 707/3
See application file for complete search history.

(56) References Cited

U.S. PATENT DOCUMENTS

| | | | |
|---|---|---|---|
| 6,665,658 B1 * | 12/2003 | DaCosta et al. | 707/3 |
| 2002/0129168 A1 * | 9/2002 | Kanai et al. | 709/247 |
| 2003/0110296 A1 * | 6/2003 | Kirsch et al. | 709/246 |
| 2003/0120813 A1 * | 6/2003 | Majumdar et al. | 709/247 |
| 2003/0188021 A1 * | 10/2003 | Challenger et al. | 709/246 |
| 2004/0049574 A1 * | 3/2004 | Watson et al. | 709/224 |
| 2004/0193676 A1 * | 9/2004 | Marks | 709/203 |
| 2004/0193699 A1 * | 9/2004 | Heymann et al. | 709/218 |

\* cited by examiner

*Primary Examiner*—Le Luu
(74) *Attorney, Agent, or Firm*—Osha • Liang LLP

(57) ABSTRACT

A method of converting between a uniform resource locator and a dynamically compressed uniform resource locator involving parsing the components of the uniform resource locator, generating a token that uniquely identifies the combination of a path and a static query string parameter of the uniform resource locator, caching the token, the path, and the static query string parameter, and appending a dynamic query string parameter of the uniform resource locator to the token to form a compressed uniform resource locator.

16 Claims, 7 Drawing Sheets

| Dynamic URL Compression Table 300 ||||||
|---|---|---|---|---|
| Token 320 | Path 330 | Static Query Parameters 340 | Session ID 350 | Dispatch Ref 360 |
| Token 1 | Path A1 | Static B1 | 1 | 1 |
| Token 2 | Path A1 | Static B2 | 1 | 1 |
| Token 3 | Path A1 | Static B3 | 1 | 1 |
| Token 4 | Path A2 | Static B1 | 1 | 2 |
| Token 5 | Path A2 | Static B4 | 2 | 3 |

*FIGURE 3*

DYNAMIC UNIFORM RESOURCE LOCATOR COMPRESSION

BACKGROUND

Generally, a uniform resource locator (URL) is an address for a resource on a network. For example, URLs are utilized by web browsers to locate resource on the Internet. A URL specifies the protocol to be used in accessing a particular resource, and the IP address or domain name where the resource is located.

In an exemplary implementation, a web service (e.g., mail application) is provided on a first network device. The means of navigation amongst various pieces of the web service (e.g., received massages, sent messages and the like) is provided by URLs. Accordingly, the first network device (e.g., server device) transmits content (e.g., response) across a communication channel to a second network device (e.g., client device) according to a specified URL. The first network device also receives content (e.g., request) across the communication channel from the second network device. In one implementation the content is encoded in an HTTP command that includes one or more URLs (e.g., links).

A URL is composed of a pathname and one or more query string parameters. In the case of an application, the application may be implemented as a hierarchy of Java Server Pages (JSP), servelets, applets, common gateway interfaces, Hyper-Text Markup Language (HTML) pages or the like. The JSPs, servelets, applets, common gateway interfaces, HTML pages or the like of the application can be organizes as a hierarchy. The hierarchy can have arbitrary depth and is organized to reflect device classes of ever increasing specificity. The deeper one goes in the hierarchy the more specific the JSP, servelet, applet, common gateway interface, HTML page or the like is to a particular device, class of devices, type of application or the like. Accordingly, the URLs of a given response can grow in size and number. Depending upon how specific the link becomes, the path and/or query string parameters can become very long. Thus, for any given response from a web application, the URLs can become a significant fraction of the total response.

SUMMARY

In general, in one aspect, the invention relates to a method of converting between a uniform resource locator and a dynamically compressed uniform resource locator comprising parsing the components of the uniform resource locator, generating a token that uniquely identifies the combination of a path and a static query string parameter of the uniform resource locator, caching the token, the path, and the static query string parameter, and appending a dynamic query string parameter of the uniform resource locator to the token to form a compressed uniform resource locator.

In general, in one aspect, the invention relates to a computer-readable medium containing instructions which when executed cause a network device to implement a method comprising receiving content containing a uniform resource locator, parsing the components of the uniform resource locator, determining whether a compression object corresponding to the uniform resource locator has previously been cached, generating a token that uniquely identifies the combination of a path and a static query string parameter of the uniform resource locator if the compression object has not previously been cached, caching the compression object if the compression object has not previously been cached, retrieving the token from the compression object if the compression object has previously been cached, appending a dynamic query string parameter of the uniform resource locator to the token to form a compressed uniform resource locator, encoding the compressed uniform resource locator in a response, and sending the response.

In general, in one aspect, the invention relates to a compressed uniform resource locator comprising a token, wherein a path and a static query string parameter of a uniform resource locator is uniquely identified, and a dynamic query string parameter, of the uniform resource locator, appended to the token.

In general, in one aspect, the invention relates to A network system having a plurality of nodes, comprising a token, wherein a path and a static query string parameter of a uniform resource locator is uniquely identified, and a dynamic query string parameter, of the uniform resource locator, appended to the token, wherein the token is located on any one of the plurality of nodes, and wherein the dynamic query string parameter is located on any one of the plurality of nodes.

Other aspects of the invention will be apparent from the following description and the appended claims.

BRIEF DESCRIPTION OF DRAWINGS

FIG. 3 shows a data diagram of a dynamic uniform resource locator compression table, in accordance with one embodiment of the invention.

DETAILED DESCRIPTION

Figure 1:
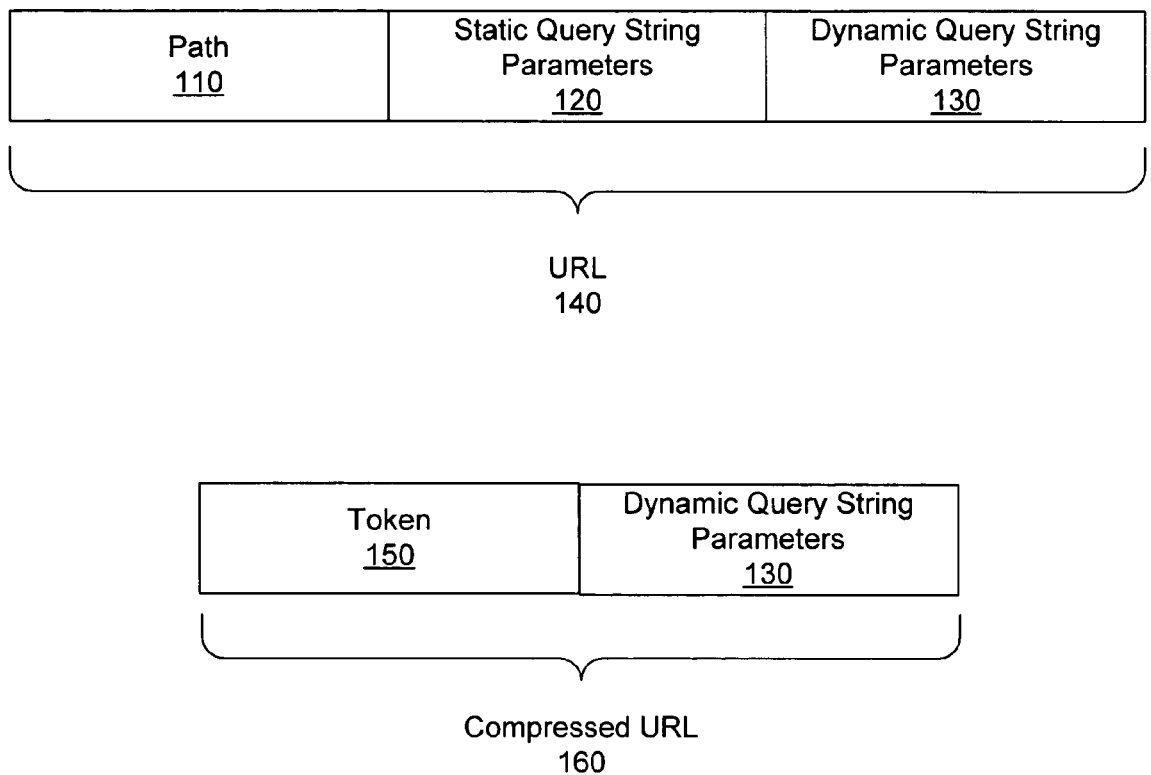
FIG. 1 shows a data diagram of a uniform resource locator and a corresponding dynamic compression thereof, in accordance with one embodiment of the invention.

Specific embodiments of the invention will now be described in detail with reference to the accompanying figures. Like elements in the various figures are denoted by like reference numerals for consistency.

In the following detailed description of one or more embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

FIG. 1 shows a data diagram of a uniform resource locator (URL) 140 and a corresponding dynamic compression 160 thereof, in accordance with one embodiment of the invention. The URL 140 is composed of a path 110 and one or more query string parameters 120, 130. The URL 140 can have an arbitrary number of query string parameters 120, 130, wherein each parameter can be of arbitrary length.

There are two types of query string parameters, static query string parameters 120 and dynamic query string parameters 130. Static query string parameters 120 are those query string parameters of a given URL 140 that are not modified by a requesting device. Dynamic query string parameters 130 are those query string parameters of a given URL 140 that are modified by a requesting device. For example, a requesting device may specify a value of a named dynamic query string parameter.

The URL 140 is compressed by reducing the path 110 and static query string parameters 120 into a token 150. The dynamic query string parameters 130 are appended to the token 150 to form the compressed URL 160. The token 150 is a unique identifier associated with the combination of the particular path 110 and static query string parameters 120.

Similarly, The URL 140 can be reconstructed from the compressed URL 160 by determining the path 110 and the static query string parameters 120 from the token 150 in the compressed URL. The dynamic query string parameters 130 are appended to the determined path 110 and static query string parameters 120 to reconstruct the URL 140.

Figure 2:
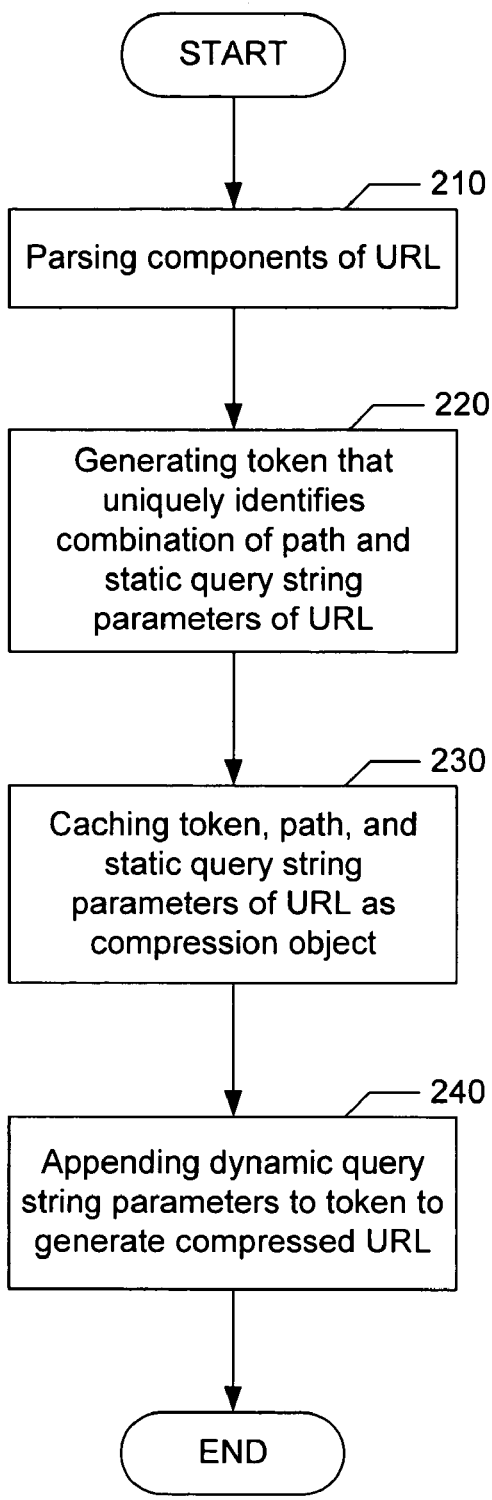
FIG. 2 shows a method of dynamically compressing a uniform resource locator, in accordance with one embodiment of the invention.

FIG. 2 shows a method of dynamically compressing a uniform resource locator (URL), in accordance with one embodiment of the invention. As depicted in FIG. 2, the path, static query string parameters and dynamic query string parameters of a particular URL are identified at 210. The path of the URL denotes a request for a particular resource (e.g., JSP, servelet, applet, common gateway interface, HTML page or the like). The static type parameters of a URL, from a requesting network device (e.g., client device), will have the same name and value as was originally provided by a responding network device (e.g., web server). The dynamic type parameters of a URL, from the requesting device, may have a value specified that was not contained in the content originally sent by the responding network device. Because the path and static parameters in a response and a subsequent request thereto are the same, the path and static parameters need not be sent.

At 220, a token that uniquely identifies the combination of the particular path and static query string parameters is generated. At 230, the path, static query string parameters and token are cached as a compression object. In one implementation, the token, path and static query string parameters are cached locally in a dynamic URL compression table (e.g., in the web server). At 240, the dynamic query string parameters are appended to the token to generate a compressed URL.

Additionally, the invention may be implemented on a distributed system having a plurality of nodes, where each portion of the invention (e.g., the token, the dynamic query string parameter, etc.) may be located on a different node within the distributed system. In one embodiment of the invention, the node corresponds to a computer system. Alternatively, the node may correspond to a processor with associated physical memory.

FIG. 3 shows a data diagram of a dynamic uniform resource locator (URL) compression table 300, in accordance with one embodiment of the invention. The dynamic URL compression table 300 includes one or more compression objects (e.g., records) 310. Each compression object 310 includes a token 320, a path 330 and one or more static query string parameters 340. A particular token 320 uniquely identifies a particular combination of path 330 and one or more query string parameter 340. As will be described in more detail below (e.g., with respect to FIGS. 5 and 6), each compression object 310 may also include a session identifier 350 and a dispatch reference 360.

Figure 4:
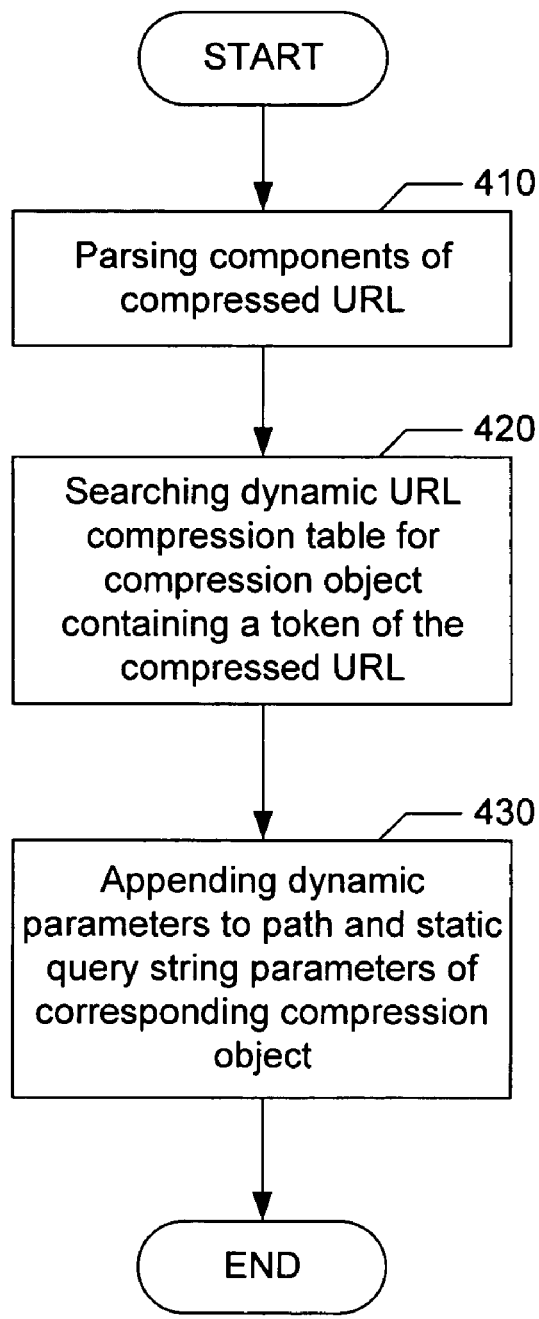
FIG. 4 shows a method of reconstructing a uniform resource locator from a dynamically compressed uniform resource locator, in accordance with one embodiment of the invention.

FIG. 4 shows a method of reconstructing a uniform resource locator (URL) from a dynamically compressed URL, in accordance with one embodiment of the invention. The token and dynamic query string parameters of a particular compressed URL are identified, at 410. At 420, the token is utilized to search a dynamic URL compression table. The compression object containing the matching token includes corresponding path and static query string parameters. At 430, the reconstructed URL is generated by appending the dynamic query string parameters to the path and static query string parameters of the corresponding compression object.

Figure 5:
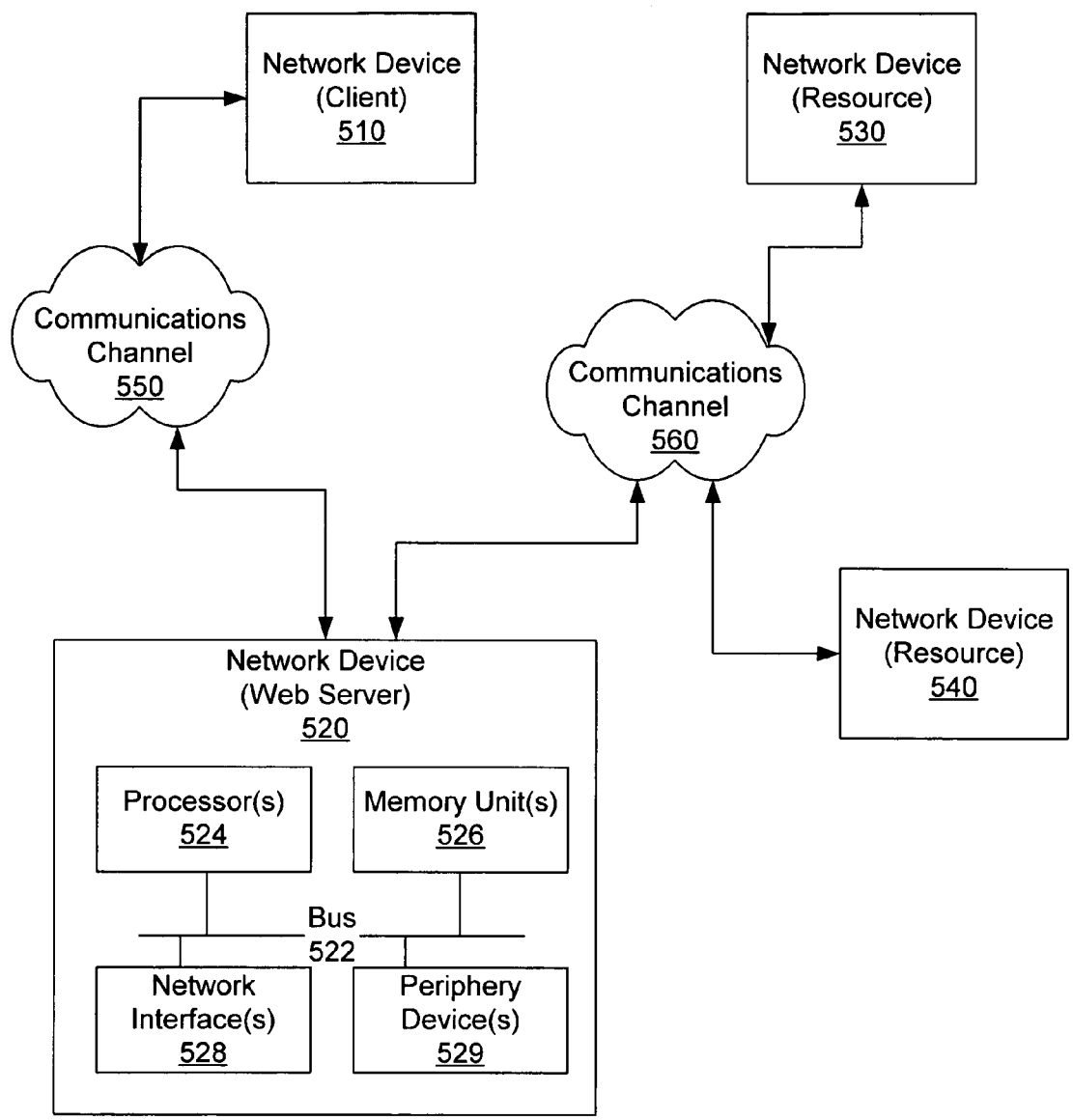
FIG. 5 shows a block diagram of a network for implementing embodiments of the invention.

FIG. 5 shows a block diagram of a network for implementing embodiments of the invention. The exemplary network includes a plurality of network devices 510-540 communicatively coupled by one or more communication channels 550, 560. In one implementation, a network device 510 is a client device, a network device 520 is a web server, and network devices 530-540 each provide one or more resources (e.g., web applications).

Each network device (e.g., for example the web server 520) includes a bus 522 for communication information and instructions. One or more processors 524 are coupled to the bus 522 for processing information and instructions. One or more memory units 526 are also coupled to the bus 522 for storing information and instructions for the processor 524. The memory unit 526 may include volatile memory (e.g., random access memory, static RAM, dynamic RAM, and the like), non-volatile memory (e.g., read only memory, programmable ROM, flash memory, EPROM, EEPROM, and the like), mass data storage (e.g., hard disk, optical disk, floppy disk, and the like), and the like. Optionally, the network device may include one or more peripheral devices (e.g., display, keyboard, pointing device, speaker, and the like) 529 coupled to the bus 522. The network device also includes one or more network interfaces 528 coupled to the bus 522. The network interface 528 provides for communicating with other network devices across a communication channel.

Certain processes and steps of embodiments of the invention are realized as a series of instructions (e.g., code) that reside on a computer-readable medium, such as the memory unit 526, and are executed by the processor 524 of the network device (e.g., web server 520). When executed, the instructions cause the processor 524 to provide a dynamic uniform resource locator (URL) compression schema.

Upon connection (e.g., session binding) of the client device (e.g., wireless device) 510 to the web server 520, the client device 510 sends a first request for content (e.g., HTML web page) to the web server 520. The web server 520 generates a first response to the client device 510 that contains one or more URLs (e.g., links). In the course of generating the response, the dynamic URL compression schema of the web server 520 dynamically compresses the one or more URLs.

Each URL is compressed by identifying the path, static query string parameters and dynamic query string parameters. The web server 520 checks a dynamic URL compression table to determine if the particular combination of the path and static query string parameters (e.g., compression object) is already cached. If the particular combination of path and static query string parameters is cached, the web server 520 uses the associated token for dynamically compressing the particular URL. If the particular combination of path and static query string parameters is not cached, the web server 520 generates a unique token representing the particular combination of path and static query string parameters (e.g., compression object) and caches the token, path and static query string parameters in the dynamic URL compression table. The web server 520 appends the particular dynamic query string parameters to the associated token to form the compressed URL. Each such compressed URL is then sent as part of the content encoded in the first response sent to the client device 510.

Each compression object cached in the dynamic URL compression table may also include a session identifier and/or a dispatcher reference. If the session is a cookie session, the session identifier is encoded in the cookie that accompanies the set of URLs of the response. If the session is a cookie-less session, the session identifier is encoded in each compressed URL of the response. The session identifier provides for client aware and/or device aware navigation. The dispatcher reference identifies the particular JSP, servelet, applet, common gateway interface, HTML page or the like to be used for dispatching the request of a particular resource represented by the URL. In an optional feature, a cache defeating value may also be encoded in each compressed URL of the response.

In one embodiment of the invention, a dynamic URL compression table is maintained for each user. Thus, the associated paths, static parameters and tokens (e.g., each compression object for a particular user) are cached in a separate dynamic URL compression table according to the user. Maintaining dynamic URL compression tables on a per user basis provides a measure of security that prevents a particular user's session from being exposed to other users.

Upon selection of a link (e.g., compressed URL in response) the client device 510 sends a second request containing a compressed URL selected from the first response. It is appreciated that one or more dynamic parameters of the selected compressed URL may be modified by the client device. However, the path and static query string parameters represented by the token of the selected compressed URL remain unchanged.

The dynamic URL compression schema of the web server 520 receives the compressed URL composed of the token and dynamic query string parameters. The token and session identifier of the compressed URL are utilized to determine the corresponding path and static query string parameters (e.g., compression object) from the dynamic URL compression table. The dynamic parameters are appended to the corresponding path and static query string parameters to form the reconstructed URL. The web server 520 is thereafter able to determine the requested resource from which to obtain the requested content represented.

If a dispatcher reference is part of the compression object, the corresponding dispatcher reference is utilized to determine the appropriate JSP, servelets applet, common gateway interface, HTML page or the like for handling the particular request for content represented by the URL.

Figure 6A:
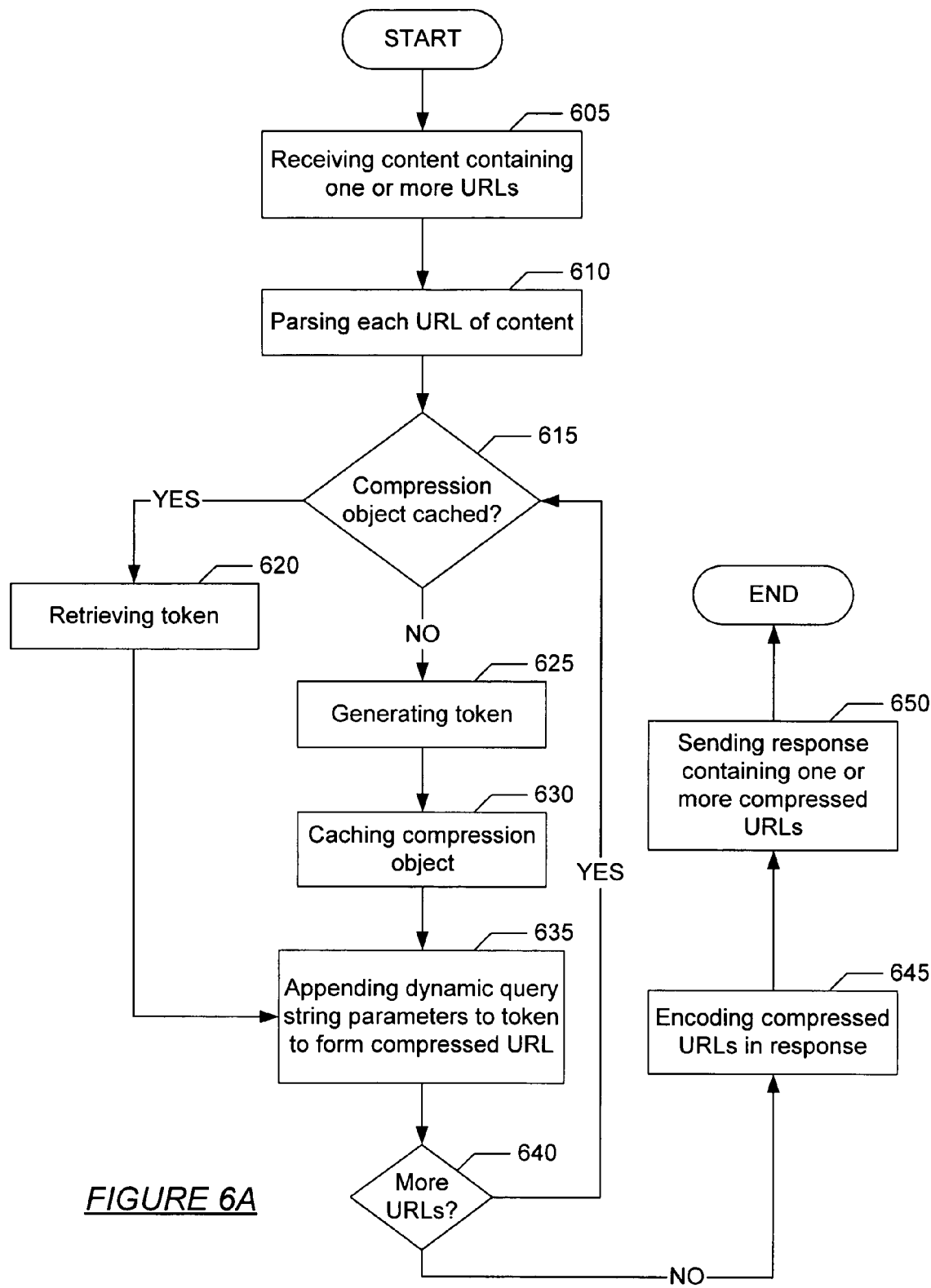
FIGS. 6A and 6B show a method of dynamically compressing a uniform resource locator and reconstructing the uniform resource locator there from, in accordance with one embodiment of the invention.
Figure 6B:
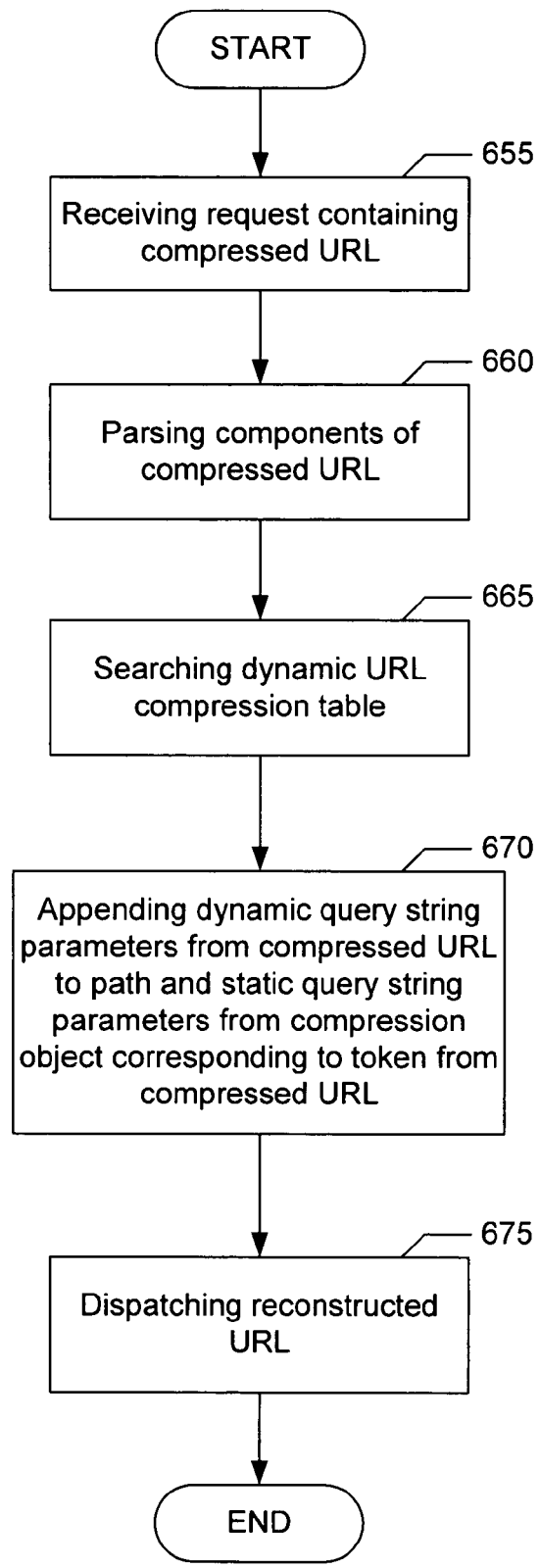

Referring now to FIGS. 6A and 6B, a computer implemented method of dynamically compressing a uniform resource locator (URL) and reconstructing the URL there from, in accordance with one embodiment of the invention, is shown. As depicted in FIG. 6A, a dynamic URL compression schema compresses one or more URLs contained in content to be sent as a response (e.g., HTTP response).

At 605, the dynamic URL compression schema receives content to be encoded as a response. The content includes one or more URLs. At 610, each URL is parsed to determined the path, static query string parameters and dynamic query string parameters thereof.

At 615, a dynamic URL compression table is searched to determine whether the particular combination of the path and static query string parameters (e.g., compression object), of each URL, is cached. If the particular combination of path and static query string parameters is cached, the associated token is retrieved, at 620. If the particular combination of path and static query string parameters is not cached, a token uniquely identifying the combination is generated, at 625. At 630, the generated token and associated path and static query string parameters are cached.

At 635, the corresponding dynamic query string parameters are appended to the corresponding token to generate each compressed URL. Each compressed URL corresponds to a particular URL of the content to be encoded in the response.

In a cookie session, the response is generated to include a cookie and the plurality of compressed URLs. The session identifier is encoded in the cookie of the response. In a cookie-less session, the response is generated to include a plurality of compressed URLs. The session identifier is encoded in each of the compressed URL of the response. The session identifier may be cached at 630, along with the corresponding token, path and static query string parameters. If a dispatcher reference is utilized, the dispatcher reference may also be cached at 630.

At 640, the compressed URLs are encoded in the response. At 645, the response is sent to a client device (e.g., in response to a request). Thus, the compressed URLs are sent as part of the content being sent by the web server in place of the URL.

As depicted in FIG. 6B, the dynamic URL compression schema reconstructs a URL from a compressed URL contained in a request. At 655, the dynamic URL compression schema receives a request containing a compressed URL from the second device (e.g., client device). The request may further include a cookie. A session identifier may optionally be encoded in the compressed URL or the cookie. At 660, the compressed URL is parsed to determine a token and one or more dynamic query string parameters.

At 665, the token is utilized to search the dynamic URL compression table. The compression object (e.g., record) having the matching token contains the corresponding path and static query string parameters. If the dynamic URL compression table also contains a session identifier, the session identifier of the request is utilized in addition to the token to match to a corresponding compression object in the dynamic URL compression table.

At 670, the dynamic string parameters contained in the compressed URL are appended to the corresponding path and static query string parameters to generate a reconstructed URL. At 675, the reconstructed URL is then dispatched for processing by an appropriate JSP. If the dynamic URL compression table also includes a dispatcher reference in the matching compression object, the corresponding dispatcher reference is utilized to dispatch the reconstructed URL to the appropriate JSP, servelet, applet, common gateway interface, HTML pages or the like.

Embodiments of the present invention provide for compressing URLs and reconstructing URLs from the compressed URLs. The compressed URLs of reduced size may be utilized in limited bandwidth applications, such as wireless application, to minimize the impact of URLs on the functionality of such applications. Accordingly, embodiments of the present invention reduce the overall bandwidth required for requests and responses in a network. Embodiments of the present invention also provide for generating client aware URLs. Accordingly, embodiments of the present invention enable navigating between java server pages of applications.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of converting between a uniform resource locator and a dynamically compressed uniform resource locator comprising:
   parsing components of the uniform resource locator, wherein parsing the components of the uniform resource locator comprises determining the path, the static query string parameter, and the dynamic query string parameter of the uniform resource locator;
   generating a token that uniquely identifies the combination of a path and a static query string parameter of the uniform resource locator;
   caching the token in a network device memory, the path, and the static query string parameter; and
   appending a dynamic query string parameter of the uniform resource locator to the token to form a compressed uniform resource locator.

2. The method according to claim 1, wherein the token, the path, and the static query string parameter are cached in a dynamic compression table as a compression object.

3. The method according to claim 2, further comprising:
   caching a session identifier in the dynamic compression table as a part of the compression object.

4. The method according to claim 2, further comprising:
   caching a dispatch reference in the dynamic compression table as part of the compression object.

5. The method according to claim 1, further comprising:
   parsing the components of the compressed uniform resource locator;
   searching a dynamic uniform resource locator compression table for a corresponding compression object containing a token of the compressed uniform resource locator; and
   appending a dynamic query string parameter of the compressed uniform resource locator to a path and a static query string parameter of the corresponding compression object.

6. The method according to claim 5, wherein the parsing the components of the compressed uniform resource locator comprises determining the token and the dynamic query string parameter of the compressed uniform resource locator.

7. A computer storage computer readable medium containing instructions which when executed cause a network device to implement a method comprising:
   receiving content containing a uniform resource locator;
   parsing the components of the uniform resource locator, wherein parsing the components of the uniform resource locator comprises determining the path, the static query string parameter, and the dynamic query string parameter of the uniform resource locator;
   determining whether a compression object corresponding to the uniform resource locator has previously been cached;
   generating a token that uniquely identifies the combination of a path and a static query string parameter of the uniform resource locator if the compression object has not previously been cached;
   caching the compression object if the compression object has not previously been cached in a network device memory;
   retrieving the token from the compression object if the compression object has previously been cached;
   appending a dynamic query string parameter of the uniform resource locator to the token to form a compressed uniform resource locator;
   encoding the compressed uniform resource locator in a response; and
   sending the response.

8. The computer storage medium according to claim 7, further comprising:
   receiving a request containing the compressed uniform resource locator;
   parsing the components of the compressed uniform resource locator;
   searching a dynamic uniform resource locator compression table for a corresponding compression object containing a token of the compressed uniform resource locator;
   appending a dynamic query string parameter of the compressed uniform resource locator to a path and a static query string parameter of the corresponding compression object to form a reconstructed uniform resource locator; and
   dispatching the reconstructed uniform resource locator.

9. The computer storage medium according to claim 7, wherein the compression object is cached locally in a dynamic uniform resource locator table.

10. The computer storage medium according to claim 9, wherein the dynamic uniform resource locator table is maintained for a single user.

11. The computer storage computer readable medium according to claim 7, further comprising: caching a session identifier as a part of the compression object.

12. The computer storage medium according to claim 11, wherein the session identifier is encoded in a cookie of the response.

13. The computer storage medium according to claim 11, wherein the session identifier is encoded in the compressed uniform resource locator of the response.

14. The computer storage medium according to claim 11, further comprising: caching a dispatcher reference as a part of the compression object.

15. The computer storage medium according to claim 14, further comprising:
   receiving a request containing the compressed uniform resource locator;
   parsing the components of the compressed uniform resource locator;
   searching a dynamic uniform resource locator compression table for a corresponding compression object containing a token of the compressed uniform resource locator;
   appending a dynamic query string parameter of the compressed uniform resource locator to a path and a static query string parameter of the corresponding compression object to form a reconstructed uniform resource locator; and
   dispatching the reconstructed uniform resource locator to a resource selected from the group consisting of a java server page, a servelet, an applet, common gateway interface and an HTML page according to the dispatcher reference of the corresponding compression object.

16. The computer storage medium according to claim 15, wherein said parsing the components of the compressed uniform resource locator comprises determining the token and the dynamic query string parameter of the compressed uniform resource locator.

* * * * *

UNITED STATES PATENT AND TRADEMARK OFFICE
CERTIFICATE OF CORRECTION

| | | |
|---|---|---|
| PATENT NO. | : 7,539,776 B1 | Page 1 of 1 |
| APPLICATION NO. | : 10/870605 | |
| DATED | : May 26, 2009 | |
| INVENTOR(S) | : John E. Saare et al. | |

It is certified that error appears in the above-identified patent and that said Letters Patent is hereby corrected as shown below:

In Claim 7, column 7, line 47, "computer readable" should be removed.

Signed and Sealed this

Twenty-first Day of July, 2009

JOHN DOLL
*Acting Director of the United States Patent and Trademark Office*